(12) United States Patent
Kuehnel et al.

(10) Patent No.: US 9,267,466 B2
(45) Date of Patent: Feb. 23, 2016

(54) COOLER ARRANGEMENT

(75) Inventors: Hans-Ulrich Kuehnel, Moenchengladbach (DE); Peter Corbach, Bochum (DE); Hans-Juergen Huesges, Willich (DE)

(73) Assignee: PIERBURG GMBH, Neuss (DE)

( * ) Notice: Subject to any disclaimer, the term of this patent is extended or adjusted under 35 U.S.C. 154(b) by 259 days.

(21) Appl. No.: 13/822,294

(22) PCT Filed: Aug. 31, 2011

(86) PCT No.: PCT/EP2011/065050
§ 371 (c)(1),
(2), (4) Date: Mar. 12, 2013

(87) PCT Pub. No.: WO2012/034866
PCT Pub. Date: Mar. 22, 2012

(65) Prior Publication Data
US 2013/0167813 A1   Jul. 4, 2013

(30) Foreign Application Priority Data
Sep. 14, 2010  (DE) .......................... 10 2010 045 259

(51) Int. Cl.
*F02M 25/07* (2006.01)
*F01P 3/20* (2006.01)
*F01N 13/08* (2010.01)

(52) U.S. Cl.
CPC ............ *F02M 25/07* (2013.01); *F02M 25/0735* (2013.01); *F02M 25/0737* (2013.01); *F02M 25/0771* (2013.01); *F02M 25/0795* (2013.01); *Y02T 10/121* (2013.01)

(58) Field of Classification Search
CPC .............. F02M 25/07; F02M 25/0715; F02M 25/0726; F02M 25/0731; F02M 25/0732; F02M 25/0737; F02M 25/077; F02M 25/0795; F02M 25/0757; F01P 3/20; F01N 13/08; F01N 3/043; F01N 3/046
USPC .............................. 123/568.12, 568.21, 41.52
See application file for complete search history.

(56) References Cited

U.S. PATENT DOCUMENTS 6,216,677 B1    4/2001  McConnell et al.
6,826,903 B2 * 12/2004  Yahata .................. F02D 41/021
                                                     123/568.12

(Continued)

FOREIGN PATENT DOCUMENTS

DE   10 2007 049 336 A1   4/2009
EP        1 643 097 A1    4/2006

(Continued)

*Primary Examiner* — Lindsay Low
*Assistant Examiner* — Grant Moubry
(74) *Attorney, Agent, or Firm* — Norman B. Thot

(57) ABSTRACT

A cooler arrangement for connection to an exhaust gas manifold or to an exhaust gas outlet of an engine block of an internal combustion machine includes an exhaust gas cooler comprising at least one exhaust gas duct and a coolant jacket. The exhaust gas cooler is configured to be mounted at the engine block or at the exhaust gas manifold. An exhaust gas recirculation valve is configured to regulate an exhaust gas flow. An actuator is disposed on a side of the exhaust gas recirculation valve opposite the exhaust gas cooler. The actuator is configured to actuate the exhaust gas recirculation valve. A coolant duct segment is arranged between the exhaust gas manifold or the engine block and the actuator. The coolant duct segment is fluidically connected to the coolant jacket.

12 Claims, 3 Drawing Sheets

(56) References Cited

U.S. PATENT DOCUMENTS

| | | | |
|---|---|---|---|
| 7,077,114 B2* | 7/2006 | Husges | F02M 25/0729 123/568.12 |
| 7,461,641 B1* | 12/2008 | Styles et al. | 123/568.12 |
| 2006/0207578 A1 | 9/2006 | Gallino et al. | |
| 2011/0094485 A1* | 4/2011 | Vuk et al. | 123/568.21 |
| 2011/0094486 A1* | 4/2011 | Vuk | 123/568.21 |

FOREIGN PATENT DOCUMENTS

| | | |
|---|---|---|
| EP | 2 378 092 A2 | 10/2011 |
| KR | 10-2009-0132804 A | 12/2009 |
| WO | WO 2009/022113 A1 | 2/2009 |
| WO | WO 2009/047278 A1 | 4/2009 |

* cited by examiner

COOLER ARRANGEMENT

CROSS REFERENCE TO PRIOR APPLICATIONS

This application is a U.S. National Phase application under 35 U.S.C. §371 of International Application No. PCT/EP2011/065050, filed on Aug. 31, 2011 and which claims benefit to German Patent Application No. 10 2010 045 259.9, filed on Sep. 14, 2010. The International Application was published in German on Mar. 22, 2012 as WO 2012/034866 A1 under PCT Article 21(2).

FIELD

The present invention relates to a cooler arrangement for connection to an exhaust gas manifold or an exhaust gas outlet of an engine block of an internal combustion machine having an exhaust gas cooler with an exhaust gas duct and a coolant jacket mounted on the engine block or on the exhaust gas manifold, an exhaust gas recirculation valve by means of which the exhaust gas flow can be regulated, and an actuator by means of which the exhaust gas recirculation valve can be actuated, the actuator being disposed on the side of the exhaust gas recirculation valve opposite the exhaust gas cooler.

BACKGROUND

For the sake of a simpler assembly and because of their reduced space requirements, exhaust gas cooler modules have been developed in increasing numbers in recent years, wherein an exhaust gas recirculation valve is arranged in a valve housing upstream or downstream of an exhaust gas cooler, the valve housing and the exhaust gas cooler forming a structural unit, by which they are jointly connected directly to the outlet portion of the engine block or of the exhaust gas manifold of the internal combustion engine in order to reduce the number of the conduits needed in the engine compartment.

EP 1 643 097 A1 describes an exhaust gas cooler module wherein a heat exchanger housing is fastened to a flange plate through which the coolant ducts of the housing are connected with the coolant circuit of the internal combustion engine. A valve housing is fastened to the heat exchanger housing via a flange and extends into an exhaust gas inlet region of the heat exchanger that is arranged upstream of the actual cooling path but is nevertheless already formed with cooling ducts that surround the valve housing. This inlet region correspondingly serves to cool the valve body. There is a drawback, however, in that no thermal separation from the actuator is provided, while the housing thereof is still subjected to a high thermal load, especially due to heat radiation from the engine block. Since, however, very high temperatures of about 700° C. prevail at this site, there is a problem, especially when electric controllers are used, of excessive thermal load on the actuator, which may cause both inaccuracies in position control and a failure of the actuator and thus of the valve.

Another cooler module is described in WO 2009/047278 A1 which also comprises an exhaust gas cooler as well as a bypass valve and an exhaust gas recirculation valve, which are connected with the housing of the exhaust gas cooler through a distributor housing. For the cooling of the exhaust gas recirculation valve, the distributor housing comprises coolant ducts. The actuator is arranged on a side of the module remote from the engine block so that a shielding is provided by the distributor housing. This embodiment, however, comes with an increased space requirement in the direction remote from the engine block. Modern internal combustion engines, however, often offer no additional space in that area.

SUMMARY

An aspect of the present invention is to provide a cooler arrangement with which the functionality of the actuator can be provided over a long service life and wherein, at the same time, a minimum dimension to the side remote from the engine block is provided so that the cooler arrangement can be mounted at the engine block or at the exhaust gas manifold and in close proximity thereto, using the space available.

In an embodiment, the present invention provides a cooler arrangement for connection to an exhaust gas manifold or to an exhaust gas outlet of an engine block of an internal combustion machine which includes an exhaust gas cooler comprising at least one exhaust gas duct and a coolant jacket. The exhaust gas cooler is configured to be mounted at the engine block or at the exhaust gas manifold. An exhaust gas recirculation valve is configured to regulate an exhaust gas flow. An actuator is disposed on a side of the exhaust gas recirculation valve opposite the exhaust gas cooler. The actuator is configured to actuate the exhaust gas recirculation valve. A coolant duct segment is arranged between the exhaust gas manifold or the engine block and the actuator. The coolant duct segment is fluidically connected to the coolant jacket.

BRIEF DESCRIPTION OF THE DRAWINGS

The present invention is described in greater detail below on the basis of embodiments and of the drawings in which.

DETAILED DESCRIPTION

Figure 1:
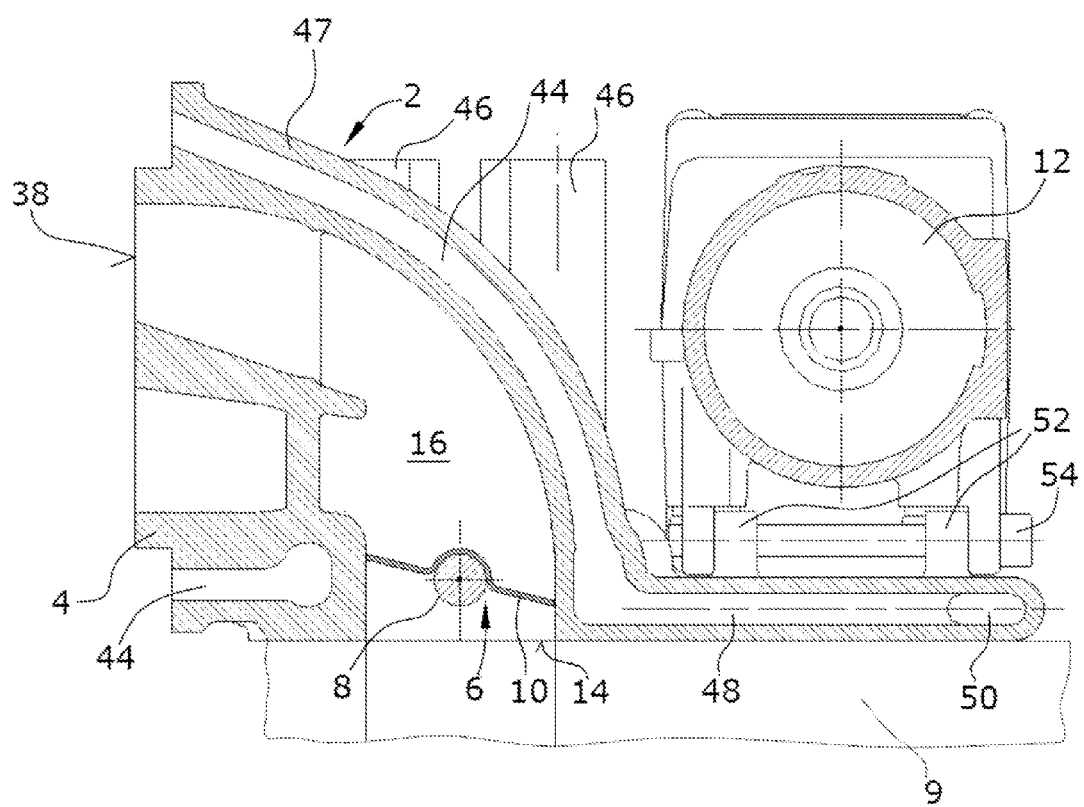
FIG. 1 shows a side elevational view of a detail of a cooler arrangement of the present invention, shown in section.

The fact that a coolant duct segment, which is in fluid communication with the coolant jacket of the exhaust gas cooler, is arranged between the exhaust gas manifold or the engine block and the actuator of the exhaust gas recirculation valve results in a thermal separation of the engine block or the exhaust gas manifold and the actuator. The actuator can thus be arranged in immediate proximity to the engine block. The assembly effort is not thereby increased.

In an embodiment of the present invention, a pre-cooler can, for example, be arranged in the downstream direction of the exhaust gas between the exhaust gas cooler and the exhaust gas manifold or the engine block, whose pre-cooler housing has at least one coolant duct formed therein through which the coolant duct segment is connected with the coolant jacket of the exhaust gas cooler. It is thus achieved that the entire coolant supply is made directly to the coolant duct of a connected heat exchanger without having to use additional hose lines. An efficient cooling capacity exists at the same time in the region of the flap or flaps so that standard bearings, levers and springs can be used. Despite an assembly immediately at the exhaust gas manifold, this efficient cooling made directly at the origin of the heat allows the reduction of the load on all subsequent components.

In an embodiment of the present invention, the coolant duct segment can, for example, be formed in the pre-cooler housing so that no additional components must be used to realize the thermal separation of the actuator. No hose lines are needed inside the module.

In order to provide a flow in the coolant duct segment and to thereby increase the cooling effect, two coolant duct segments are provided between the engine block or the exhaust gas manifold and the actuator, which segments are in fluid communication via a connecting duct. The forward flow of the coolant occurs in the first of the two segments, while the return flow occurs in the second segment.

In an embodiment of the present invention, at least one exhaust gas duct providing a deflection by 90° can, for example, be formed in the pre-cooler housing, and at least one coolant duct is respectively formed at two opposite sides of the at least one exhaust gas duct so that subsequent components, such as the heat exchanger, can be arranged parallel to the engine block, whereby the dimension of the cooler arrangement towards the side remote from the engine block is reduced to a minimum. At the same time, a reliable pre-cooling of the exhaust gas occurs immediately upon entry into the cooler arrangement.

In an embodiment of the present invention, the at least one coolant duct extends in the pre-cooler housing from the coolant duct segment between the engine block or the exhaust gas manifold and the actuator along the 90° deflection in the pre-cooler housing to the coolant jacket at the side of the exhaust gas cooler remote from the exhaust gas manifold or the engine block. The inflowing exhaust gas is thereby reliably cooled in the pre-cooler over the entire inflow length. An additional thermal separation of the actuator towards the pre-cooler housing is also obtained, whereby the thermal load thereon is further reduced.

For a further reduction of the assembly effort, the exhaust gas recirculation valve is a flap valve whose turning shaft is supported in the pre-cooler housing. The pre-cooler housing is at the same time the bearing housing of the flap, whereby additional mounting surfaces can be omitted.

A cooler arrangement is thus provided that can be arranged entirely in immediate proximity to the exhaust gas manifold or to the engine block, without taking the risk of excessive thermal load on the actuator. Connection lines between the components can be omitted both for the coolant circuit and for exhaust gas guiding. The number of components is reduced to a minimum so that the assembly effort can be kept very low. The cooler arrangement can be fastened directly to the exhaust gas manifold or an exhaust gas outlet of an engine block. Due to the good cooling effect of this arrangement, less costly materials can be used, since the cooling efficiency of such an arrangement is increased when compared to known deigns. It is also conceivable to reduce the dimensions of the downstream cooler because of the good cooling effect of the pre-cooler.

An embodiment of a cooler arrangement according to the present invention is illustrated in the Figures and will be hereinafter described.

The detail of the cooler arrangement of the present invention illustrated in the Figures comprises a pre-cooler 2 with a pre-cooler housing 4, as well as an exhaust gas recirculation valve 6 supported in the pre-cooler housing 4, the exhaust gas recirculation valve 6 being formed by two flap elements 10 arranged on a common shaft 8 for rotation with the same, of which one flap element 10 is visible in the sectional view. The common shaft 8 is connected with an actuator 12 through a linkage. The actuator 12 can be an electromotive actuator.

The pre-cooler housing 4 comprises a first flange 14 that serves as an exhaust gas inlet into the cooler arrangement and by which the pre-cooler housing 4 can be fastened directly to an engine block or exhaust gas manifold 9 as is shown in FIG. 1. This exhaust gas inlet is divided into two parts and leads to an exhaust gas duct 16 in the pre-cooler housing 4, which duct is also divided into two parts, the flow sections thereof being adapted to be controlled by one of the flap elements 10, respectively.

Figure 2:
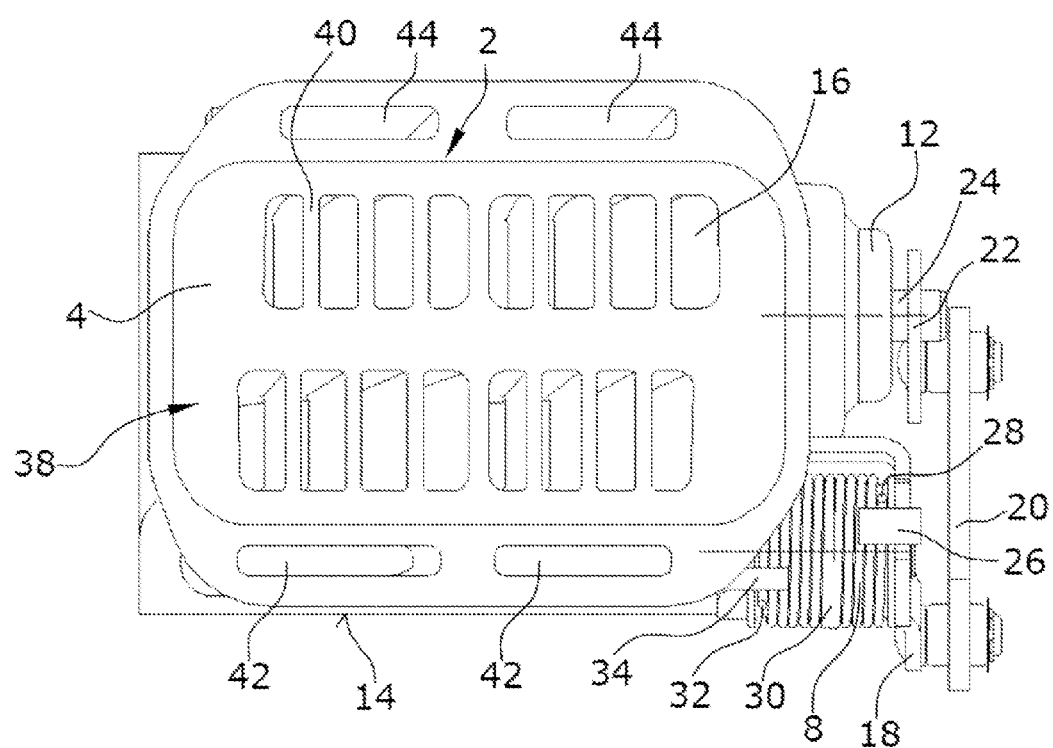
FIG. 2 shows a frontal view of the pre-cooler of the cooler arrangement of FIG. 1, shown as a top plan view.

An end of the common shaft 8 protrudes laterally from the pre-cooler housing 4, as can be seen in FIG. 2. A first eccentric 18 is provided on this end for rotation with the same, the first eccentric 18 being coupled with a second eccentric 22 via a lever 20, whereby the linkage is formed. The second eccentric 22 is arranged on a drive shaft 24 of the actuator 12 for rotation with the drive shaft 24, so that a rotary movement of the actuator 12 is transmitted to the common shaft 8 of the exhaust gas recirculation valve 6.

The first eccentric 18 further has a stop element 26 formed thereon against which a first end leg 28 of a return spring 30 abuts that surrounds the common shaft 8. This return spring 30 is designed as a helical spring that, in a manner known per se, biases the shaft 8 to the closed position of the two flap elements 10. For this purpose, a spring leg 32 formed at the other end of the helical spring abuts against a stop 34 on the pre-cooler housing 4.

The exhaust gas duct 16, or the two parallel exhaust gas ducts 16, continue in the pre-cooler housing 4 and are deflected by 90° so that an exhaust gas outlet from the pre-cooler housing 4, which is formed in a second flange 38, is arranged perpendicularly to the exhaust gas inlet of the first flange 14. It can be seen in FIGS. 2 and/or 3 that the two exhaust gas ducts 16 split into a plurality of exhaust gas ducts along the pre-cooler housing 4, between which respective walls 40 are formed that are extended by connection with an exhaust gas cooler 3, as well as coolant ducts 42, 44 arranged outside are connected with a coolant jacket 7 of the exhaust gas cooler 3 that is connected with the coolant circuit of the internal combustion machine. The exhaust gas cooler 3 is usually welded to the pre-cooler 2.

The pre-cooler housing 4 is fastened to the engine block by means of screws. For this purpose, the pre-cooler housing 4 has a plurality of domes 46 with throughholes formed thereon into which the screws can be inserted for fastening.

Figure 3:
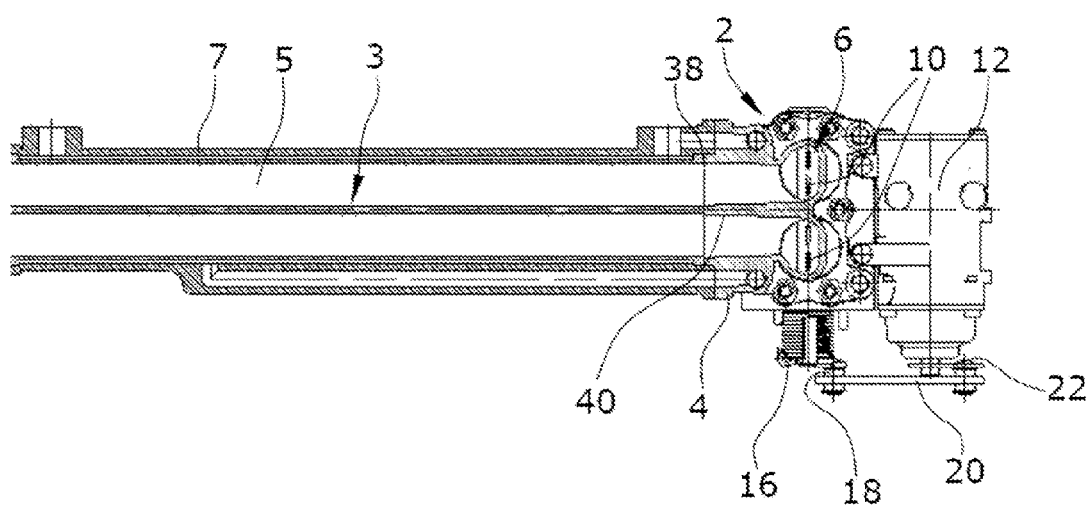
FIG. 3 shows the cooler arrangement of the present invention attached to an exhaust gas cooler.

For the pre-cooler housing 4 to assume its cooling function, the coolant ducts 42, 44 are formed in the pre-cooler housing 4, two parallel coolant ducts 42 thereof extending in the region between the exhaust gas duct 5 of the exhaust gas cooler 3 and the engine block, and two coolant ducts 44 extending on the side of the exhaust gas cooler 3 remote from the engine block (as is shown in FIG. 3).

Whereas the coolant ducts 42 extend parallel to the surface of the first flange 14, the coolant ducts 44 have a 90° deflection like the exhaust gas ducts 16, i.e., they extend parallel to the exhaust gas ducts 16 on an outer wall 47 of the pre-cooler housing 4. The exhaust gas ducts 16 are accordingly shielded by the coolant ducts 44 in the direction of the actuator 12.

According to the present invention, the coolant ducts 44 comprise coolant duct segments 48 arranged in the region between the actuator 12 and the engine block and extending parallel to the first flange 14 for the entire length of the actuator 12. These coolant duct segments 48, numbering two in the present embodiment, are in fluid communication via a connecting duct 50 so that a forward flow occurs in the first coolant duct segment 48, while a return flow of the coolant occurs in the opposite segment, whereby dead water regions can be avoided in a reliable manner.

Further, at this segment of the pre-cooler housing 4, four eye-type bearings 52 are formed on the surface, through which the actuator 12 is fastened to the pre-cooler housing 4 by means of two screws 54 respectively inserted through two opposite eye-type bearings 52.

The cooler arrangement of the present invention thus achieves a full thermal shielding of the actuator 12 both from the engine block and from the exhaust gas duct 16 of the cooler arrangement, so that a reliable functionality of the actuator 12 can be provided over a long service life. Both in the region of the first flange 14, where the heat input is the highest, and in the rest of the pre-cooler housing 4, the present cooler arrangement allows for a high heat dissipation via the coolant, so that good cooling efficiencies result therefrom. Further, less costly materials can be used for the housings. Due to this good cooling effect of the pre-cooler, as well as the accommodation of an exhaust gas recirculation valve or a bypass flap in the same, a downstream heat exchanger can be built with significantly smaller dimensions, since the temperature is dissipated to a high extent directly at the inlet. The structure proposed is also suitable for large flow volumes, as encountered especially in utility vehicles. Otherwise necessary pipe lines can be omitted.

It should be clear that various modifications to the described embodiments are possible within the scope of protection of the main claim. In particular, various valves may be integrated in the pre-cooler. The manufacturing and the structural design of the housing parts may also be modified depending on the application. For example, the first flange may be flanged to the pre-cooler housing as a separate component with the exhaust gas recirculation valve. Depending on the application, the number of coolant ducts and exhaust gas ducts may moreover be varied, in particular, only one exhaust gas duct may be formed in the housing, without departing from the scope of protection.

The present invention is not limited to embodiments described herein; reference should be had to the appended claims.

What is claimed is:

1. A cooler arrangement for connection to an exhaust gas manifold or to an exhaust gas outlet of an engine block of an internal combustion machine, the cooler arrangement comprising:
   an exhaust gas cooler comprising at least one exhaust gas duct and a coolant jacket, the exhaust gas cooler being configured to be mounted at the engine block or at the exhaust gas manifold;
   an exhaust gas recirculation valve configured to regulate an exhaust gas flow;
   an actuator disposed on a side of the exhaust gas recirculation valve opposite the exhaust gas cooler, the actuator being configured to actuate the exhaust gas recirculation valve;
   a coolant duct segment arranged between the exhaust gas manifold or the engine block and the actuator, the coolant duct segment being fluidically connected to the coolant jacket;
   a pre-cooler comprising a pre-cooler housing, the pre-cooler being arranged between the exhaust gas cooler and the exhaust gas manifold, as seen in the flow direction of the exhaust gas; and
   at least one coolant duct formed in the pre-cooler housing, the at least one coolant duct being configured to connect the coolant duct segment with the coolant jacket of the exhaust gas cooler.

2. The cooler arrangement as recited in claim 1, wherein the coolant duct segment is formed in the pre-cooler housing.

3. The cooler arrangement as recited in claim 1, wherein two coolant duct segments are provided, and further comprising a connecting duct, wherein the two coolant duct segments are formed between the engine block or the exhaust gas manifold and the actuator so as to be in a fluid communication via the connecting duct.

4. The cooler arrangement as recited in claim 1, wherein the pre-cooler housing comprises at least one exhaust gas duct having a 90° deflection, and the at least one coolant duct is formed on two opposite respective sides of the at least one exhaust gas duct.

5. The cooler arrangement as recited in claim 1, wherein the at least one coolant duct in the pre-cooler housing extends from the coolant duct segment between the engine block or the exhaust gas manifold and the actuator along the 90° deflection in the pre-cooler housing to the coolant jacket on a side of the exhaust gas cooler remote from the engine block or the exhaust gas manifold.

6. The cooler arrangement as recited in claim 1, wherein the exhaust gas recirculation valve is a flap valve comprising a shaft, wherein the shaft is supported in the pre-cooler housing.

7. A cooler arrangement for connection to an exhaust gas manifold or to an exhaust gas outlet of an engine block of an internal combustion machine, the cooler arrangement comprising:
   an exhaust gas cooler comprising at least one exhaust gas duct and a coolant jacket, the exhaust gas cooler is mounted at the engine block or at the exhaust gas manifold;
   an exhaust gas recirculation valve configured to regulate an exhaust gas flow;
   an actuator disposed on a side of the exhaust gas recirculation valve opposite the exhaust gas cooler, the actuator being configured to actuate the exhaust gas recirculation valve;
   a coolant duct segment extending along a length of the actuator between the exhaust gas manifold or the engine block and the actuator, the coolant duct segment being fluidically connected to the coolant jacket;
   a pre-cooler comprising a pre-cooler housing, the pre-cooler being arranged between the exhaust gas cooler and the exhaust gas manifold, as seen in the flow direction of the exhaust gas; and
   at least one coolant duct formed in the pre-cooler housing, the at least one coolant duct being configured to connect the coolant duct segment with the coolant jacket of the exhaust gas cooler.

8. The cooler arrangement as recited in claim 7, wherein the coolant duct segment is formed in the pre-cooler housing.

9. The cooler arrangement as recited in claim 7, wherein two coolant duct segments are provided, and further comprising a connecting duct, wherein the two coolant duct segments are formed between the engine block or the exhaust gas manifold and the actuator so as to be in a fluid communication via the connecting duct.

10. The cooler arrangement as recited in claim 7, wherein the pre-cooler housing comprises at least one exhaust gas duct having a 90° deflection, and the at least one coolant duct is formed on two opposite respective sides of the at least one exhaust gas duct.

11. The cooler arrangement as recited in claim 7, wherein the at least one coolant duct in the pre-cooler housing extends from the coolant duct segment between the engine block or the exhaust gas manifold and the actuator along the 90° deflection in the pre-cooler housing to the coolant jacket on a side of the exhaust gas cooler remote from the engine block or the exhaust gas manifold.

12. The cooler arrangement as recited in claim 7, wherein the exhaust gas recirculation valve is a flap valve comprising a shaft, wherein the shaft is supported in the pre-cooler housing.

* * * * *